United States Patent
Murdock et al.

(10) Patent No.: US 12,051,100 B1
(45) Date of Patent: Jul. 30, 2024

(54) IN-STORE NAVIGATION USING LIST ORDERING MODELS

(71) Applicant: Amazon Technologies, Inc., Seattle, WA (US)

(72) Inventors: Vanessa Graham Murdock, Kirkland, WA (US); Sandeep Avula, Seattle, WA (US); Neven Tomislav Boric Bargetto, Redmond, VA (US); Jason Stephen Merron, Seattle, WA (US); Timothy R. Heithaus, Snoqualmie, WA (US); Sina Khaleghi, Morgan Hill, CA (US); Andrew Michael Nienhaus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 17/317,121

(22) Filed: May 11, 2021

(51) Int. Cl.
 G06Q 30/00 (2023.01)
 G06N 3/049 (2023.01)
 G06N 7/01 (2023.01)
 G06Q 30/0601 (2023.01)
 H04W 4/021 (2018.01)

(52) U.S. Cl.
 CPC ......... *G06Q 30/0633* (2013.01); *G06N 3/049* (2013.01); *G06N 7/01* (2023.01); *G06Q 30/0631* (2013.01); *G06Q 30/0639* (2013.01); *H04W 4/021* (2013.01)

(58) Field of Classification Search
 None
 See application file for complete search history.

(56) References Cited

U.S. PATENT DOCUMENTS

| | | | | |
|---|---|---|---|---|
| 9,070,094 | B2 * | 6/2015 | Goulart | G06Q 30/0639 |
| 9,595,062 | B2 * | 3/2017 | Goulert | H04W 4/021 |
| 10,088,331 | B1 * | 10/2018 | Yeh | G01C 21/206 |
| 11,593,864 | B2 * | 2/2023 | MacLaurin | G06Q 30/0635 |
| 2014/0214590 | A1 * | 7/2014 | Argue | G06Q 30/0631 |
| | | | | 705/26.7 |
| 2019/0187864 | A1 * | 6/2019 | Yeh | G06Q 30/0641 |
| 2019/0251619 | A1 * | 8/2019 | Kuchenski | G06Q 30/0639 |

FOREIGN PATENT DOCUMENTS

WO  WO-2019125522 A1 * 6/2019 ........... G01C 21/206

OTHER PUBLICATIONS

Abhaya Asthana et al. "An Indoor Wireless System for Personalized Shopping Assistance", Mobile Computing System and Applications, 1994, pp. 69-74. (Year: 1994).*

* cited by examiner

*Primary Examiner* — Naeem U Haq
(74) *Attorney, Agent, or Firm* — Eversheds Sutherland (US) LLP

(57) ABSTRACT

Systems, devices, and methods are provided for training and/or inferencing using a list ordering model. A list ordering model, such as a Markov chain, may be trained using a plurality of lists with location metadata in common, wherein a first list of the plurality comprises items and corresponding competition timestamps. A list ordering model may accept, as an input, a plurality of items, and determine, as an output, an order for the plurality of items. Recommendations may be generated based on the determined order.

20 Claims, 8 Drawing Sheets

IN-STORE NAVIGATION USING LIST ORDERING MODELS

BACKGROUND

Mapping and/or navigation software may have generalized information of the address or GPS coordinates of a grocery store but may lack more detailed location information. While mapping and/or navigation software may be able to provide turn-by-turn driving instructions for a user, such software is not able to provide suggestions for how the user can efficiently navigate through a store to find a list of items in the store. Furthermore, obtaining detailed geolocation information for such items may be difficult and/or impractical. Techniques used in highway and road navigation may be difficult and/or impractical to implement in such contexts.

Figure 1:
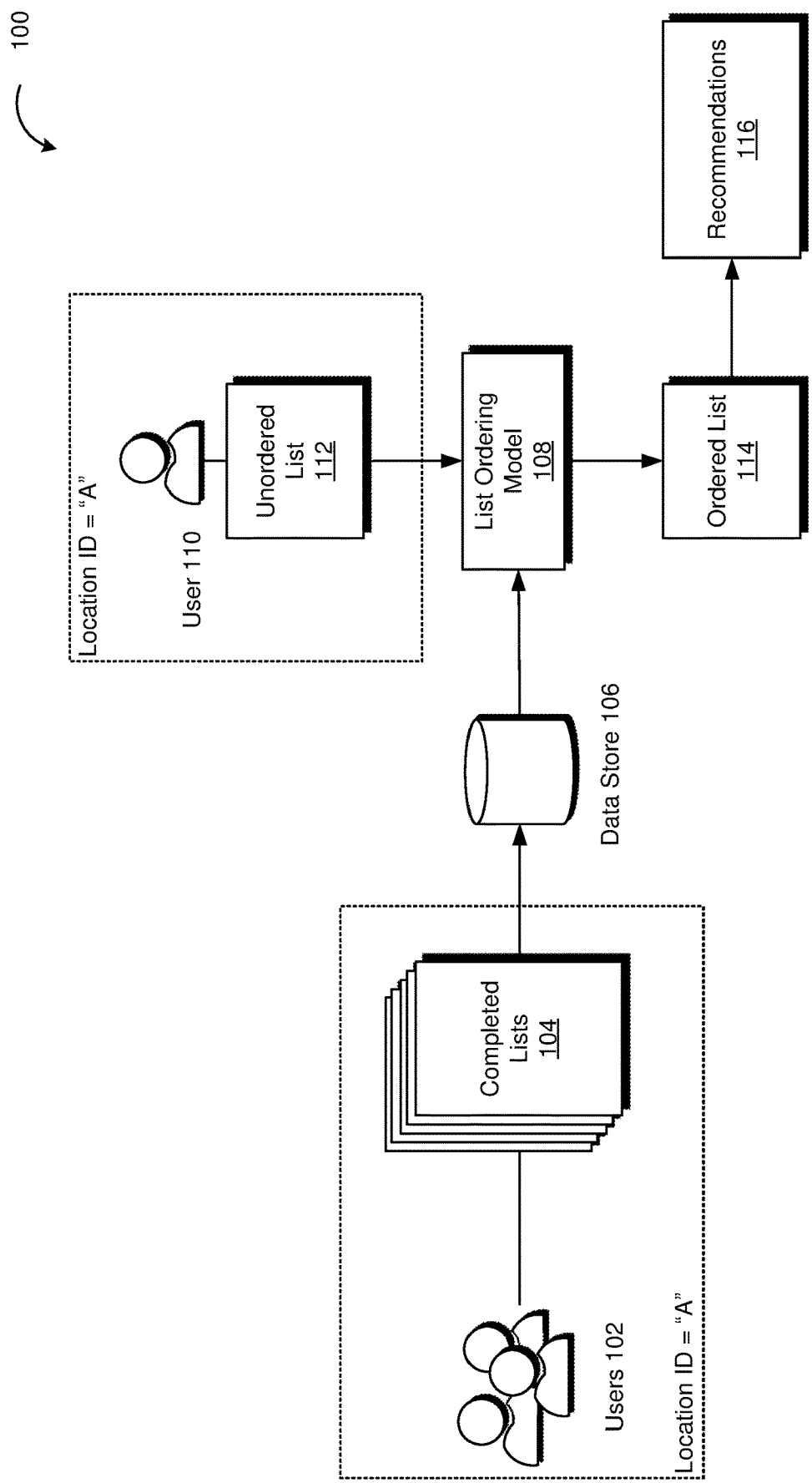
FIG. 1 illustrates a computing environment in which in-store navigation recommendations are generated, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for predicting, using a list ordering model, a navigation path for a user. Example embodiments described herein provide certain systems, methods, and devices for training a list ordering model to predict a navigation path for a user. In many circumstances, detailed location information is not readily available. For example, various types of mapping and/or navigation software may have generalized information of the address or GPS coordinates of a grocery store but may lack more detailed location information. While mapping and/or navigation software may be able to provide turn-by-turn driving instructions for a user, such software is not able to provide suggestions for how the user can efficiently navigate through a store to find a list of items in the store.

As described in greater detail below, and according to at least one embodiment, a list ordering model may be implemented as a probabilistic sequence model (e.g., hidden Markov model) or a machine learning based model (e.g., recurrent neural network). A suitable list order model may be trained using historical data recording how users had checked off items in a shopping list at a location, which may indicate when various items were found, and the trained model may be used to predict a recommended order in which a user can navigate a location based on which items are on a shopping list. The order in which items have been checked off by users in previous shopping trips can be used to predict a recommended order in which a user should find items on a current shopping list. Furthermore, the temporal proximity, between which various interactions occurred can be used to determine similarity between items and be used to cluster various items of a list together, which may further aid in a user's navigation through a particular store location to find various items. The list ordering model can be used to predict a recommended order in which a user should get items from a shopping list, even in cases where shopping list includes a new list of items that was not in the training set. A Markov model such as a Markov chain can be utilized in this context—in at least one embodiment, an initial state and a state transition matrix comprising probabilities of transitions is used to help a user navigation through a location, such as a grocery store; states correspond to respective items of a store; a transition to a state may correspond to a recommendation for a user to get an item; this process of suggesting next states can be repeated to help the user navigate through the store in a more efficient manner.

In at least one embodiment, a training data set comprising data collected from previous shopping trips of users at a particular location may be aggregated, filtered, and processed to create a list ordering model. Aggregation may refer to the collection of previous trip data from various users for a location. Of these users, the historical trip data may be filtered to identify a subset in which temporal completion information is available. For example, if a user bulk performs computer-based actions on an entire list, such as checking off all items at the end of a shopping trip, it may not provide useful information regarding whether the user interacted with two items in close proximity to each other during the trip, and such data points may be discarded and excluded from a training set data. The training set may be processed to create a list ordering model. The list ordering model may comprise states and state transition probabilities (e.g., a matrix of transition probabilities) that encode how likely transitions from one state to another states is. These states and transition probabilities may be generated based on the training data set. In various embodiments, the states correspond to logical groupings or clusters of items. Two items may be in the same cluster, if there is a high probability that, when both items are on the same list, a user will interact with both items in close temporal proximity to each other, indicating similarity between the items.

The list ordering model may receive, as an input, a list of items in an arbitrary order and produce, as an output, an ordered sequence of the list of items. The ordered sequence may be determined by identifying all permutations of the list of items (e.g., for N items, there may be up to N! permutations, depending on whether the item list allows for duplicate items). The permutation with the highest probability of occurring may be selected as the ordered list that is used to generate recommendations for user navigation. Dynamic programming techniques may be utilized to more efficiently generate the output of the sequence mode.

In at least one embodiment, a mobile application (e.g., computer software) running on a mobile device detects that a user is in a store. This determination may be made based on geolocation information of the mobile device that can be obtained in any suitable manner, such as by computing and/or otherwise receiving GPS coordinates of the mobile device's location via an integrated GPS receiver. In some embodiments, a user launches the mobile application and selects a list of items (e.g., shopping list) which is relevant for the store. Relevance of an item list may be inferred based on criteria—for example, if there is metadata or other information available that can be used to determine that the shopping list includes grocery items and location information indicates that the user has arrived at a grocery store, the user may be prompted with a graphical user interface with a suggestion or recommendation to use the grocery list for the trip. The grocery list is analyzed, in at least one embodiment, to identify a first item in the list to recommend. In some embodiments, the first item is determined based at least in part on historical data of previous shopping trips and the item of the grocery list that was selected first and/or earliest in historical shopping trips is selected as the first item to recommend. In some embodiments, probabilities for the items in the shopping list are computed and the item with the highest probability of being the first item is selected to be the first item to recommend. A sequence probability may be computed to find the order of the items that users performed computer-based actions on their list (e.g., check their list off in), which is used to recommend an order for the user to find the items of the grocery list. In some embodiments, the sequence of items with the highest probability of occurring is computed using a Markov chain and the first item of such sequence is selected as the first item to recommend. In various embodiments, ordering the grocery list in this manner results in more efficient navigation of the store to find the items on the grocery list and reduces the amount of time that the user spends in the store. Stochastic models such as Markov models may be used to identify an order in which items of a grocery list should be presented to a user. Stochastic models described herein do not require any a priori knowledge of the layout of a store, do not require specific location information about where items are located, and do not require real-time geolocation information regarding the exact location of the user within a store to determine how to order the grocery list, in accordance with at least one embodiment.

Accordingly, in various embodiments, techniques described herein obviate the need for computer hardware such as sensors to track a user within a store and computer storage services to track and access real-time information of where an item is located and improve the function of computer systems by reducing the computational needs for making accurate and helpful navigation suggestions to users.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a computing environment in which in-store navigation recommendations are generated, in accordance with one or more example embodiments of the present disclosure.

Figure 2:
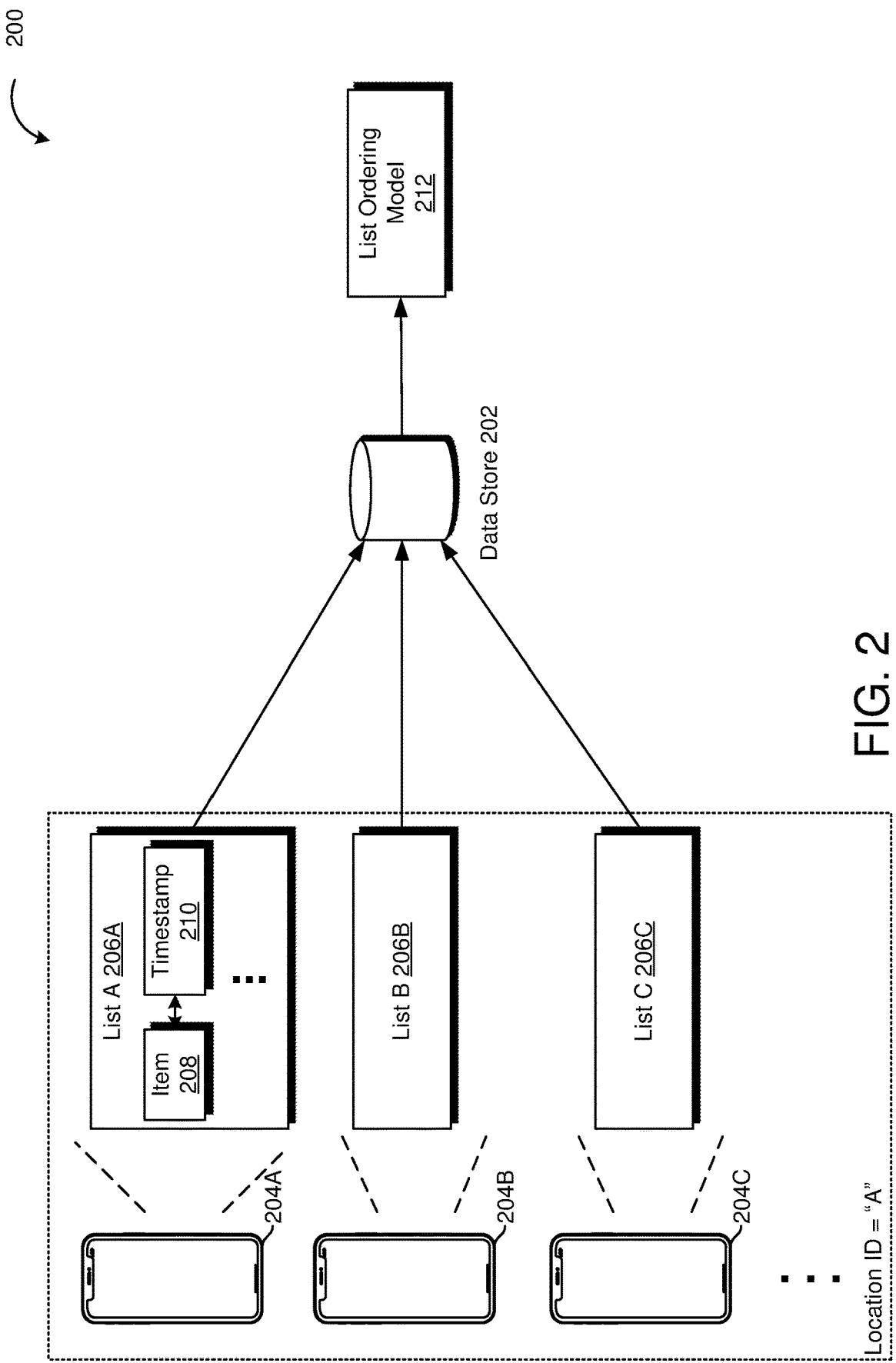
FIG. 2 illustrates a computing environment in which list data is collected to generate an identifier-specific list ordering model, in accordance with at least one embodiment.

FIG. 2 illustrates a computing environment in which list data is collected to generate an identifier-specific list ordering model, in accordance with at least one embodiment.

Figure 3:
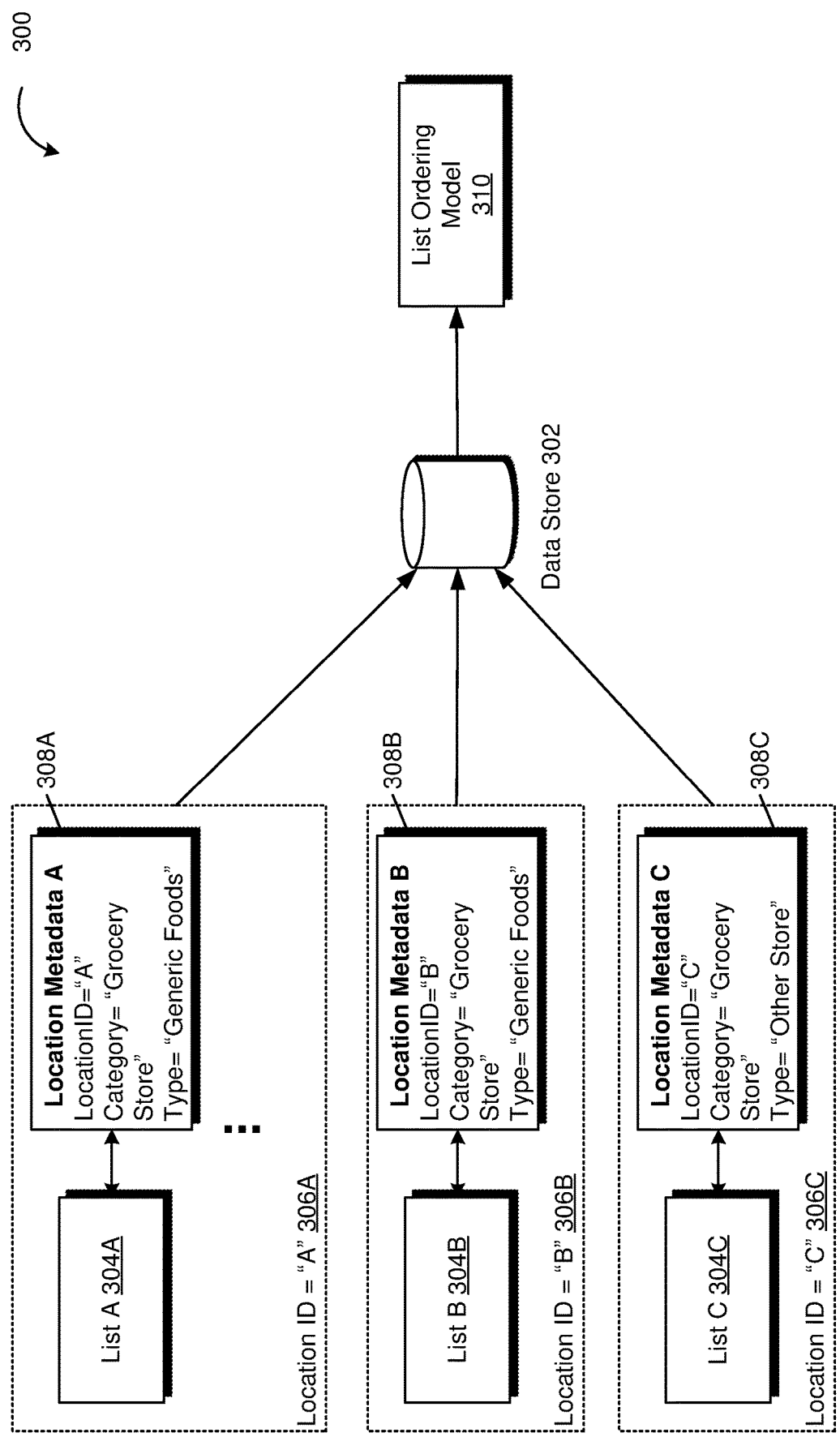
FIG. 3 illustrates a computing environment in which list data is collected to generate a list ordering model using common location metadata, in accordance with at least one embodiment.

FIG. 3 illustrates a computing environment in which list data is collected to generate a list ordering model using common location metadata, in accordance with at least one embodiment.

Figure 4:
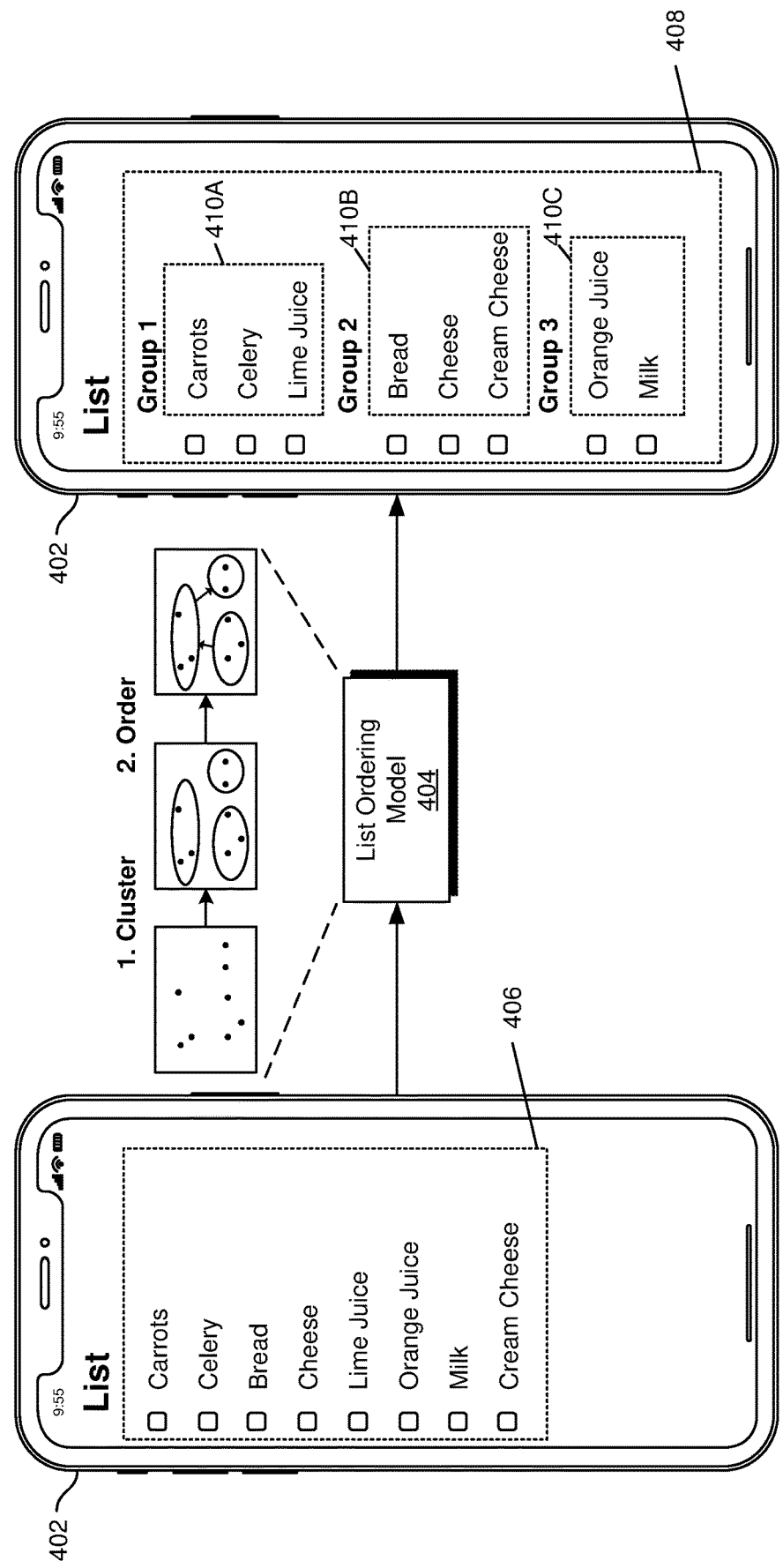
FIG. 4 illustrates a diagram in which a list ordering model generates recommendations for a list, in accordance with at least one embodiment.

FIG. 4 illustrates a diagram in which a list ordering model generates recommendations for a list, in accordance with at least one embodiment.

Figure 5:
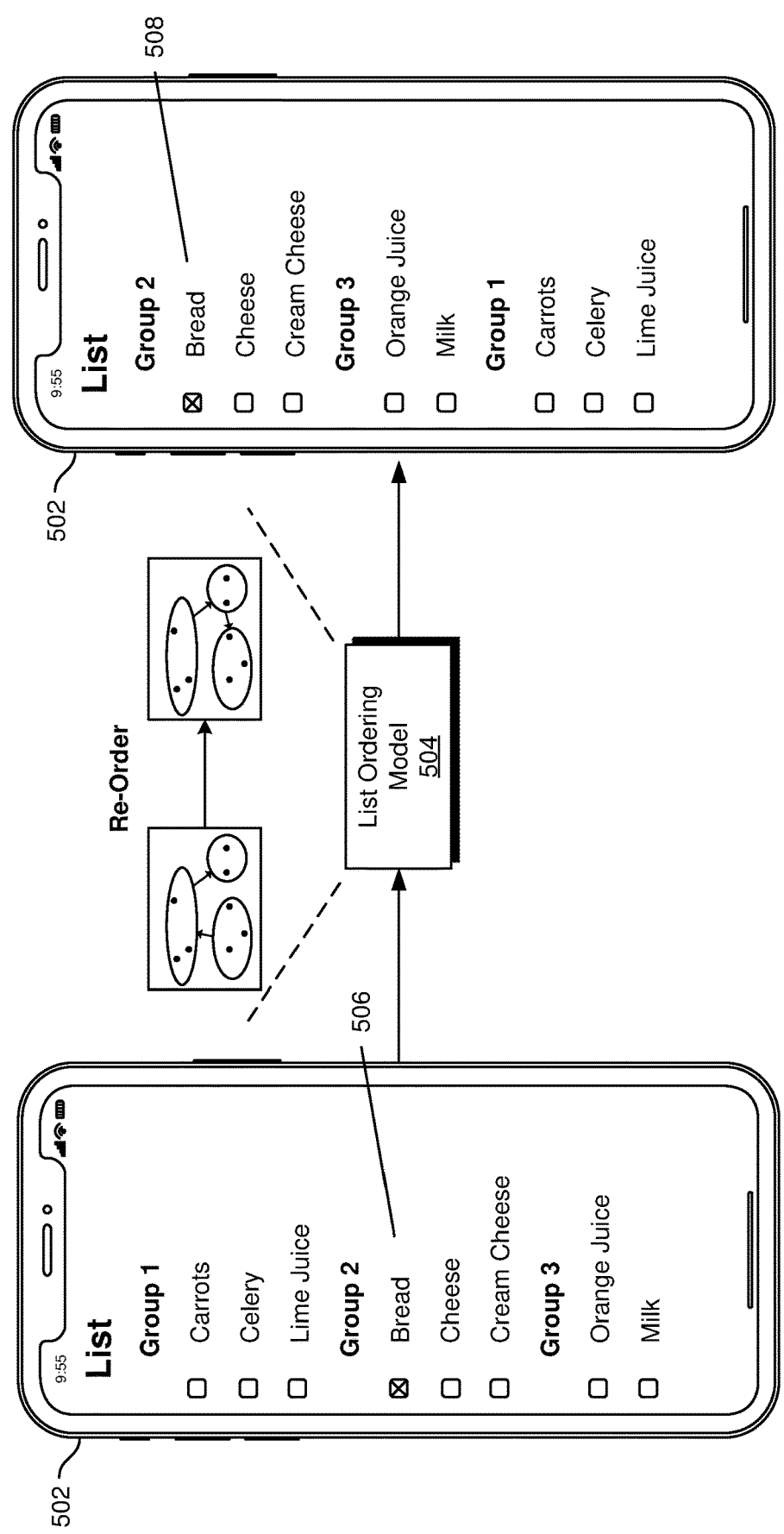
FIG. 5 illustrates a diagram in which a list ordering model dynamically updates recommendations for a list based on computer-based actions performed by a user, in accordance with at least one embodiment.

FIG. 5 illustrates a diagram in which a list ordering model dynamically updates recommendations for a list based on computer-based actions performed by a user, in accordance with at least one embodiment.

Figure 6:
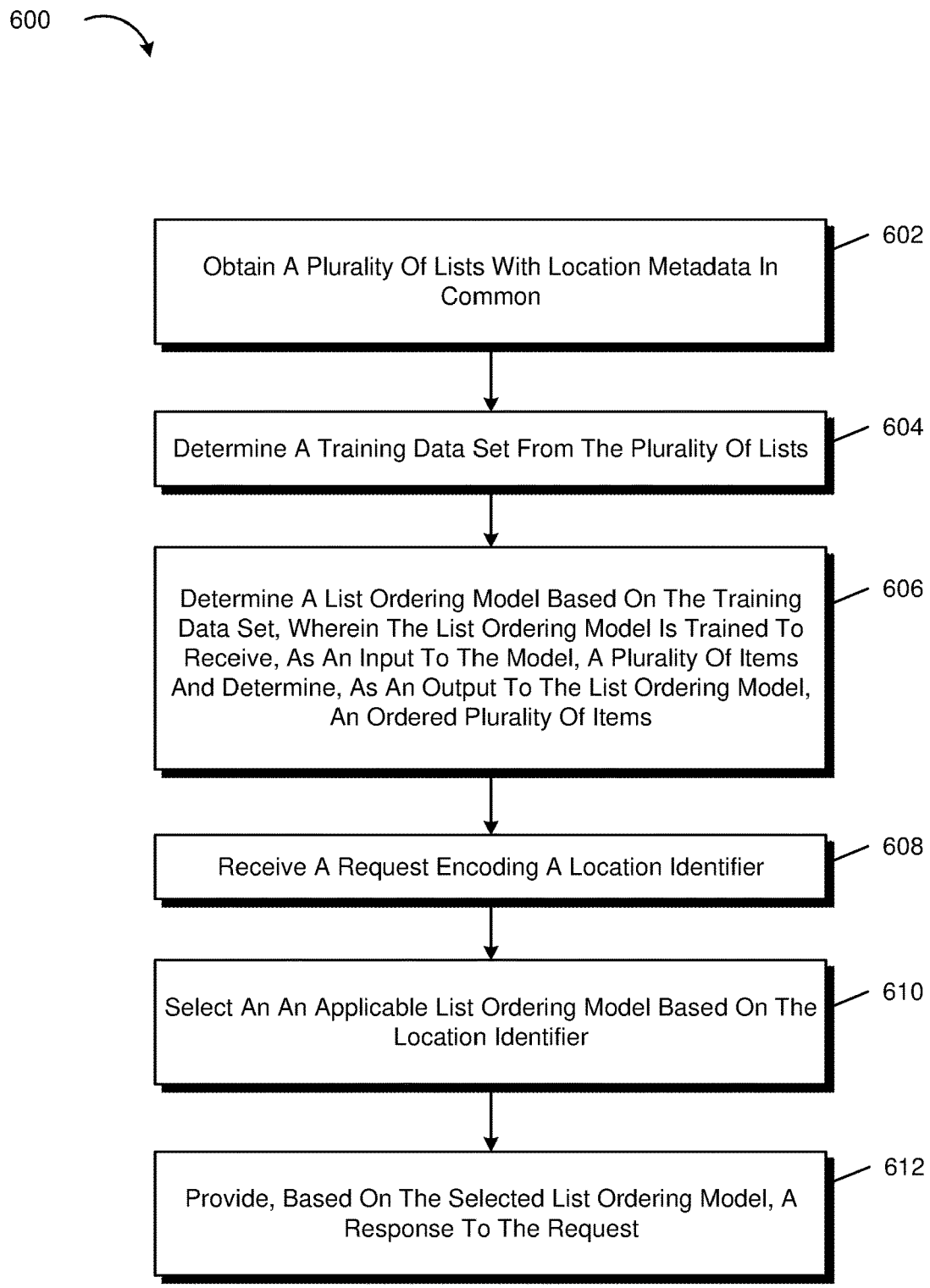
FIG. 6 shows an illustrative example of a process for generating a list ordering model that can be used to predict an order in which a list of items should be presented to a user, in accordance with one or more example embodiments of the present disclosure
Figure 7:
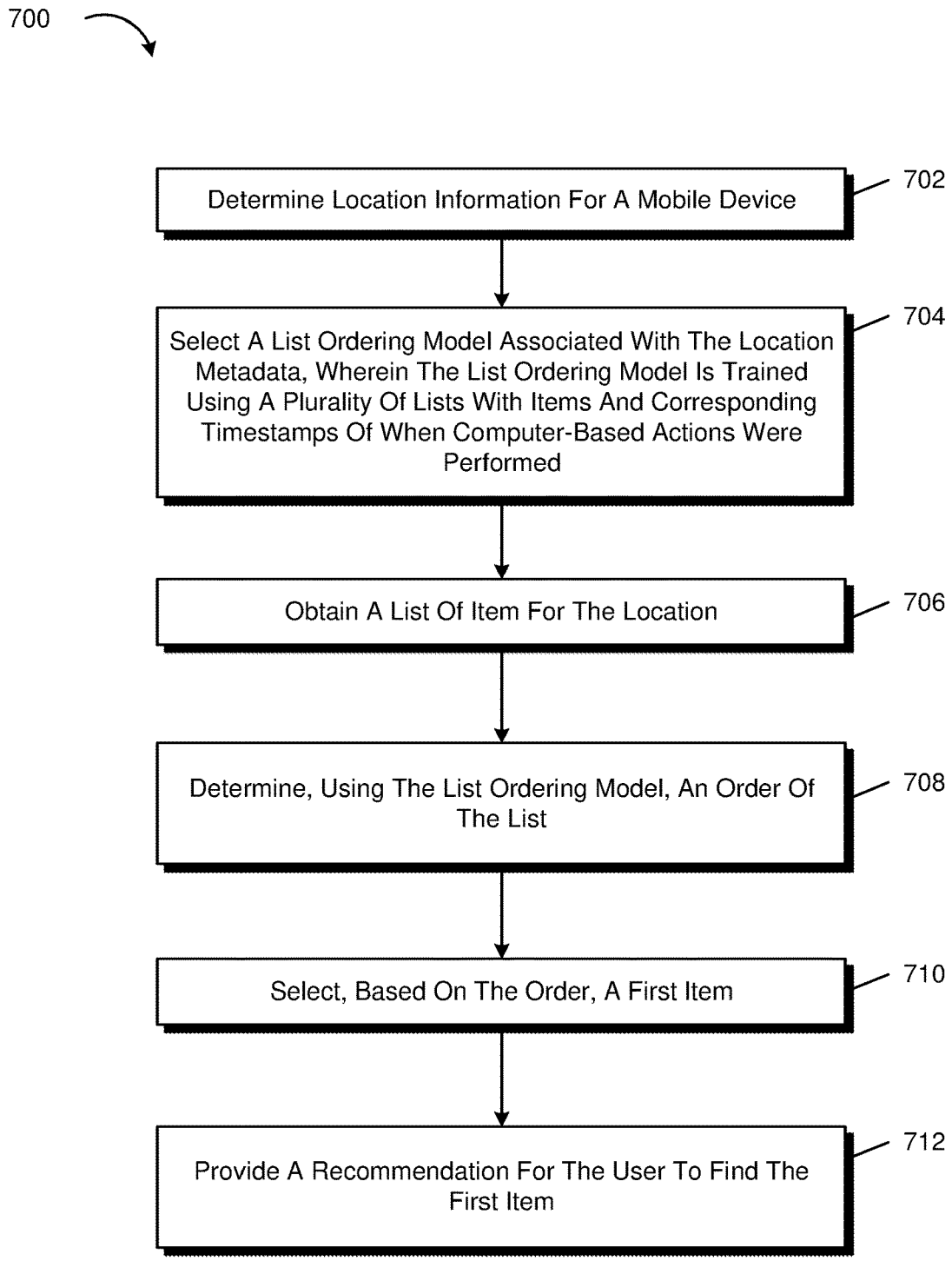
FIG. 7 shows an illustrative example of a process for generating recommendations using a list ordering model that determines an ordering for how a list of items should be presented to a user, in accordance with one or more example embodiments of the present disclosure.

FIG. 6 shows an illustrative example of a process for generating a list ordering model that can be used to predict an order in which a list of items should be presented to a user, in accordance with one or more example embodiments of the present disclosure FIG. 7 shows an illustrative example of a process for generating recommendations using a list ordering model that determines an ordering for how a list of items should be presented to a user, in accordance with one or more example embodiments of the present disclosure.

Figure 8:
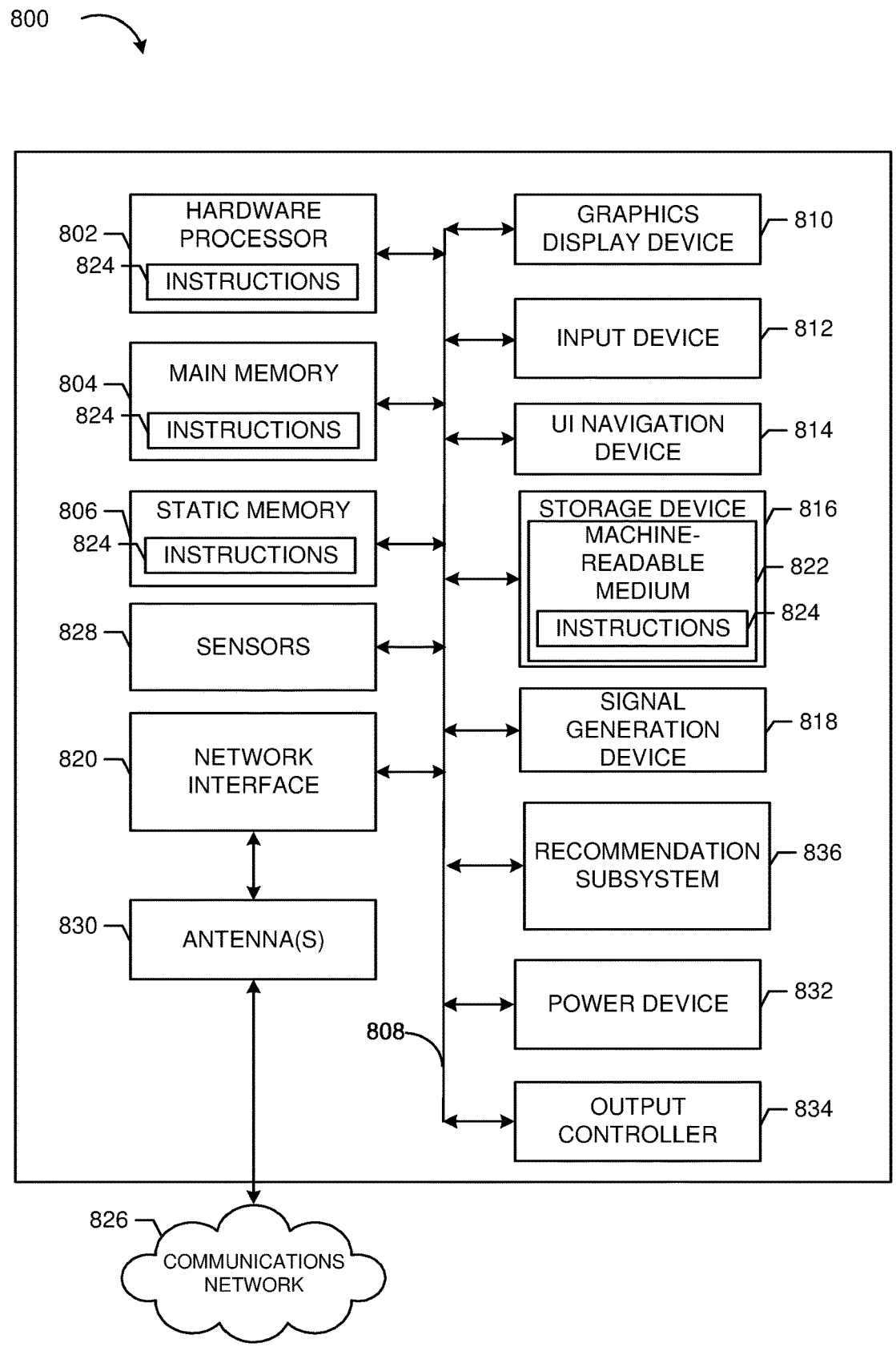
FIG. 8 illustrates a block diagram of an example machine upon which any of one or more techniques (e.g., methods) may be performed, in accordance with one or more example embodiments of the present disclosure.

FIG. 8 illustrates a block diagram of an example machine upon which any of one or more techniques (e.g., methods) may be performed, in accordance with one or more example embodiments of the present disclosure.

FIG. 1 illustrates a computing environment 100 in which in-store navigation recommendations are generated, in accordance with at least one embodiment. In at least one embodiment, users 102 may refer to mobile device users that use a mobile device at a particular location to generate completed lists. A location may be associated with a unique location identifier. For example, a location may refer to a grocery store, office, park, or other real-world location. Completed lists 104 may refer to lists that users have, at some point in the past, completed or otherwise interacted with. As described herein, a completed list may refer to a list where users have performed computer-based actions on some or all items of the list, such as checking off items on the list. Timestamps that indicate when the user interacted with respective list items may be recorded. The temporal proximity of when users interact with a first and second item may be used to perform clustering or grouping of items that users are probabilistically likely to interact with in a group or in close temporal proximity to each other. Completed lists may be described in greater detail below, such as in connection with FIG. 3.

Users 102, in various embodiments, are given the option to opt-in or opt-out of data collection. For example, if a user chooses to opt-out, the process terminates immediately, and no historical list data for the user is collected. Conversely, if a user opts-in, the user's historical shopping trips may be stripped of private and/or sensitive information and then transmitted to a data store 106. In various embodiments, data anonymization or puseudonymization techniques are utilized so that no private/sensitive information is transmitted to data store 106. In various embodiments, completed lists 104 are collected from consenting users over a period of time and stored in data store 106.

Data store 106 may be used to generate a list ordering model 108. In at least one embodiment, list ordering model 108 receives a list of items (e.g., grocery items) as an input and produces an ordering of the list. The list may be ordered based on the historical pattern of other users at the same location and may be used to predict the order in which a user will most likely navigate through a store to find various items in a list. List ordering model 108 shown in FIG. 108 may be implemented using stochastic models such as sequence models. Throughout this disclosure, Markov models and other types of sequence models may be considered illustrative examples of list ordering models and other types of list ordering models may be used in place of or in addition to such models. In at least one embodiment, completed lists 104 or a subset thereof are utilized to generate a list ordering model 108. In various embodiments, list ordering model 108 comprises a set of states and a state transition matrix that encodes the probability of moving from one state to another state. States may logically represent individual items or groups of items, but need not be explicitly encoded in such a manner.

List ordering model 108 may be used to generate recommendations for subsequent shopping trips. For example, user 110 (which may be included in or excluded from users 102) may have an unordered list 112 comprising several items stored on a mobile device. Upon reaching a location, the mobile device may prompt the user and ask whether the user would like to enable recommendations. If the user declines, then the process terminates immediately. If the user consents, then the user's location may be ascertained—for example, by using a GPS receiver of the mobile device or cellular triangulation to determine geolocation information or by using a Wi-Fi connection to determine that the mobile device is at a particular location such as a grocery store that makes Wi-Fi available. Once the user's location has been ascertained, a Markov chain for the location may be selected or otherwise obtained. In some embodiments, the mobile device submits a request with the location's identifier to a computing resource service provider (not shown in FIG. 1) via a network such as the Internet to obtain a location-specific Markov chain.

List ordering model 108 may be used to determine ordered list 114. Ordered list 114 may refer to the ordering of the list items from unordered list 112 that have the highest probability of occurring. Dynamic programming techniques may be utilized to identify the ordering of the list 112 with the highest probability of occurring. However, other non-maximal sequences may be acceptable as well, such as sequences that exceed a threshold probability or are selected empirically. Recommendations 116 may be provided to user 110—for example, by rearranging the items of unordered list 112 shown on a touchscreen of the mobile device and instructing the user to obtain the items in the specified order.

In various embodiments, recommendations are provided in clusters, groups, groupings, etc. A group of items may refer to a set of items that are likely to be selected concurrently or in close temporal proximity to each other, based on the historical shopping trip data that is collected in data store 106. In some embodiments, unordered list 112 is first organized into a set of groups, and then the set of groups are ordered. The ordering of the groups may be the sequence of groups that has the highest probability of occurring. Accordingly, in this manner, users are provided recommendations for navigating through a space that does not require geolocation data of the various items in unordered list 112.

FIG. 2 illustrates a computing environment 200 in which list data is collected to generate an identifier-specific list ordering model, in accordance with at least one embodiment. In at least one embodiment, list data is collected by a computing resource service provider and used to generate a list ordering model to generate predictions, inferences, recommendations, and the like.

In at least one embodiment, a computing resource service provider comprises a data store 202. Data store 202 may be any suitable data storage system, including but not limited to network attached storage (NAS) devices, hard disk drives, magnetic tape drives, and more. In various embodiments, data store 202 includes a database system that stores records in a structured format. Relational and non-relational database systems may be utilized to implement data store 202.

As illustrated in FIG. 2, data store 202 may be used to store data that is provided by a plurality of mobile devices that may be used by a plurality of users. A mobile device such as mobile device 204A illustrated in FIG. 2 may be a client computer system that communicates with a computing resource service provider via a network such as the Internet. In various embodiments, the mobile device includes executable code for a mobile application which communicates with the computing resource service provider. A mobile device 204A may communicate with computing resource service provider for a variety of purposes, such as to receive and send data.

FIG. 2 illustrates how shopping list data can be collected by a computing resource service provider, in accordance with at least one embodiment. In at least one embodiment, FIG. 2 illustrates a mobile device 204A may have a shopping list 206A of a trip that has already been completed. Completion of a trip does not necessarily imply that computer-based actions were performed on all items of a list. In various embodiments, as seen in FIG. 2, a historical shopping list may include several list items and corresponding timestamps of when computer-based actions were performed on the items, such as when items were checked off, skipped, or other user actions were taken. For example, the timestamp of a user indicating an item was skipped may be indicative that the user went to look for the item but that it was out of stock. Accordingly, having an item where a user performed a first computer-based action (e.g., skip the item) in close temporal proximity to another item for which a second computer-based cation was performed (e.g. checked off) may indicate that two items are typically in close physical proximity to each other and can be grouped together. For past shopping trips, the shopping list for the trip may include a plurality of list items such as list item 208 and corresponding completion timestamps such as timestamp 210.

As seen in FIG. 2, data from how previous shopping trips occurred for multiple users using different mobile devices 204A, 204B, and 204C may, with user consent, be collected and transmitted to data store 202. These shopping lists 206A, 206B, and 206C may be trips that were made at a common location. Each shopping list may be tagged with a location identifier and/or location metadata. The tags may include information about the location. For example, locations may be tagged based on the location type, category, or other information that may be used to determine common properties or traits between different locations. This location metadata may be used to aggregate list data from multiple locations into a single training set, for example, as discussed in connection with FIG. 3.

Returning to FIG. 2, users' previous shopping trips may be aggregated in data store 202 and used to generate a list ordering model 212. In various embodiments, list ordering model 212 is implemented using one or more sequence models, examples of which include Markov chain, hidden Markov model, recurrent neural network, and more. In at least one embodiment, list ordering model 212 is a stochastic model, such as a Markov chain or a hidden Markov model. In various embodiments, the list ordering model comprises a set of states and a state transition matrix that encodes the probability of moving from one state to another state. States may logically represent individual items or groups of items, but need not be explicitly encoded in such a manner. The list ordering model 212 shown in FIG. 2 may be in accordance with those described elsewhere in this disclosure, such as those described in connection with FIG. 1, FIG. 6, FIG. 7, and more. In at least one embodiment, list ordering model 212 is trained based on historical shopping trips for a specific location and is therefore an identifier-specific list ordering model.

List ordering model 212 can be used to predict a suggested order in which a user should get items where the shopping list includes new items which have not been seen previously in the training data set, in at least one embodiment. For example, a training data set may include various users' previous shopping trips with information regarding "peanut butter" such as the temporal proximity between "peanut butter" being completed or found and other items and list ordering model 212 may be trained using such data. Continuing with this example, a user may request a recommended navigation order for a list of items that includes "almond butter" which, for the sake of example, was not included in the training data set. In at least one embodiment, list items may be analyzed for semantic similarity and clustered together based on semantic similarity. For example, other training data (e.g., for other locations) may indicate that at locations where "peanut butter" and "almond butter" were both found, that computer-based actions (e.g., checked off as found) for both items were performed in close temporal proximity to each other a high percentage of the time, and list ordering model 212 may utilize this information to group "almond butter" with "peanut butter" and make a recommended navigation using the semantic similarity, even though there is no historical information relating to the current location about where "almond butter" might be found.

In various embodiments, a list ordering model is trained to predict an appropriate sequence to traverse a store to find various items in an item list even where certain items in the item list have never been encountered in historical data sets. While various embodiments described above refer to cases where an item has never been encountered at a location, the techniques may be applied in the same or substantially similar matter for items that have been encountered only a few times and/or sparsely enough where there is low confidence in the specific item.

FIG. 3 illustrates a computing environment 300 in which list data is collected to generate a list ordering model using common location metadata, in accordance with at least one embodiment. In at least one embodiment, list data is collected by a computing resource service provider and used to generate a list ordering model to generate predictions, inferences, recommendations, and the like.

Data store 302 may be implemented in accordance with those described in connection with FIG. 2. In various embodiments, data store 302 is a storage device or storage system that receives historical list data collected from multiple locations. As illustrated in FIG. 3, a first list 304A may have been collected from a first location with a first location identifier 306A, second list 304B may have been collected from a different location with second location identifier 306B, and so on. In at least one embodiment, lists 304A, 304B, 304C, etc. are collected from multiple locations with different location identifiers 306A, 306B, etc. Lists 304A, 304B, 304C, etc. may be tagged or otherwise associated with a location identifier and/or location metadata. Location metadata 308A, 308B, etc. may refer to properties of a location that may be in common with other locations. For example, as illustrated in FIG. 3, "Generic Foods" may refer to a grocery store chain that has multiple locations. In at least one embodiment, a first user shops at the first "Generic Foods" store and first list 304A records the user's shopping trip at the first "Generic Foods" store, including completion timestamps of when various items were procured. Likewise, a second user may shop at a second "Generic Foods" store and second list 304B records the second user's shopping trip at the second "Generic Foods" store including completion timestamps of various items. Both lists, from separate locations, may be transmitted and stored in data store 302 with the users' consent.

Data store 302 may be used to generate a list ordering model. In at least one embodiment, lists from multiple locations (e.g., lists associated with different location identifiers) are aggregated based on having location metadata in common. In at least one embodiment, location metadata may refer to a location identifier, location type, chain, owner, or other property of the location. A list ordering model 310 may be generated using a set of lists that have location metadata in common. For example, a list ordering model 310 may be trained using a training data set that is aggregated from multiple location identifiers that share location metadata in common. For example, as shown in FIG. 3, lists 304A, 304B, etc., from multiple "Generic Foods" stores may be aggregated to generate a single model. In some embodiments, the list ordering model 310 generated in FIG. 3 can be utilized to bootstrap a new location where there is not yet enough historical shopping list data to generate a reliable model. Continuing with this illustrative example, list ordering model 310 may be used provided that an identifier-specific list ordering model is not available. In various embodiments, list ordering model 310 is implemented using one or more sequence models, examples of which include Markov chain, hidden Markov model, recurrent neural network, and more.

In some cases, a list ordering model for a particular store may not exist. Bootstrapping techniques may be utilized so that predictions can still be generated, and be used to aid in the generation of the list ordering model by providing a starting point for the store's list ordering model that leverages certain information that may be known prior. This may be the case where a store is newly opened, renovated, or there is not yet enough historical data collected from previous shopping trips to generate a stochastic model that is tailored for the particular store. In at least one embodiment, other models may exist for a store—for example, a stochastic model may be generated based on the store type. For example, if "Generic Foods" is a grocery store chain, a list ordering model may be generated based on historical data collected for "Generic Foods" stores or all "Generic Foods" stores within a region or country and this stochastic model may be used in place of or in conjunction with a store-specific stochastic model. In various cases, this type of list ordering model may provide accurate navigation information due to stores of a chain having similar layouts. In some embodiments, more or less generalized models may exist and/or be used to aid in the generation of navigation suggestions. For example, a list ordering model may be generated for all grocery stores, all grocery stores of a certain size, and so on.

FIG. 4 illustrates a diagram 400 in which a list ordering model generates recommendations for a list, in accordance with at least one embodiment. In at least one embodiment, mobile device 402 stores executable code for using a list ordering model 404 to generate predictions for in-store navigation. In various embodiments, list ordering model 404 is implemented using one or more sequence models, examples of which include Markov chain, hidden Markov model, recurrent neural network, and more.

In at least one embodiment, an unordered 406 list of items is shown on the left side of FIG. 4 and an ordered 408 list of items is shown on right side of FIG. 4. As can be appreciated, the same items are on the left-hand side and right-hand side. Unordered 406 list includes the following items: carrots, celery, bread, cheese, lime juice, orange juice, milk, and cream cheese. List ordering model 404 may be utilized to cluster these items into groups and then the groups may be ordered based on a maximum likelihood of what order the user is to get these items.

As an example, list ordering model 404 may receive unordered 406 list as an input and first identify a set of groups or clusters for the items of the list. Items may be grouped based on temporal proximity of completion from historical shopping trips, such as those collected using techniques described in connection with FIG. 2 and FIG. 3. List ordering model 404 may then determine an order for the set of groups or clusters. The order may be determined based on the overall likelihood of a sequence of groups being completed or found in a particular order. For example, in FIG. 4, list ordering model 404 clusters the items into three groups: a first group 410A comprising {carrots, celery, lime juice}, a second group 410B comprising {bread, cheese, cream cheese}, and a third group comprising 410C {orange juice, milk}. Probabilities for each of the six permutations of these groups may be computed—{A,B,C}, {A,C,B}, {B,A,C}, {B,C,A}, {C,A,B}, and {C,B,A} and the sequence with the highest probability of occurring, according to the list ordering model, may be selected. In some embodiments, items within a group are unordered and may be displayed in any suitable order. For example, the items in the first group 410A may be displayed as {carrots, celery, lime juice}, but {lime juice, celery, carrot} may also be acceptable. In various embodiments, a grouping of items refers to a logical set of items which the user may find in close proximity to each other, but does not necessarily imply an order of items within the set. In at least one embodiment, dynamic programming techniques are utilized to select a sequence of groups that defines the recommended order. Note that while the "cheese", "cream cheese" and "milk" items are all dairy items, they may nevertheless still be categorized into different groups based on historical shopping trip data showing that "cheese" and "cream cheese" being marked as complete in close temporal proximity with each other but not "milk" which may indicate that milk, despite being a dairy product, is organized separately from other dairy products such as cream cheese and cheese.

In various embodiments, users have the ability to customize various privacy settings related to in-store navigation. For example, mobile application settings may allow a user to select one or more settings that allow the user to opt-in or opt-out of providing in-store navigation information to a service provider. For example, if a user does not wish for information related to what items are in their shopping list, which stores they shop in, and which items from the shopping list that they check off as having found in the store, they may be able to specify that such information should not be shared. Users may be able to specify what data is sent to a service provider, in at least one embodiment. Additionally, in various embodiments, personally identifiable information (PII), personal health information (PHI), and other potentially sensitive information may be protected using variation techniques, such as anonymizing or pseudonymizing the data.

In various embodiments, mobile device 402 comprises a geolocation unit such as a GPS receiver that can be used to determine the geolocation of the mobile device and may be used to determine where a user of the mobile device is located. These mobile devices may also be capable of storing and executing mobile applications, accessing networks such as the Internet, storing and accessing data over such networks, and more. In at least one embodiment, when a user launches a mobile application on a mobile device, the mobile application prompts a user to request permission to access location information and/or allow the user to select whether to provide navigation recommendations. In some cases, a user may wish for the order of a shopping list at a location to be preserved, in which case the user may select to use the user's manually selected order for the shopping list.

In various embodiments, mobile device 402 obtains consent from a user and, with the user's consent, the user's shopping list is analyzed using a list ordering model to determine an ordering for the user's shopping list. An example of a list ordering model is a Markov model, such as a Markov chain or hidden Markov model. In at least one embodiment, the location of the user is used to identify a particular identifier that is associated with a particular store (e.g., grocery store) and the particular identifier is used to identify a particular stochastic model for that store. For example, the user's mobile device may submit a request to a service provider over a network for a stochastic model that is trained based on historical data aggregated across multiple users of the service provider and the service provider may send, as a response to the request, a stochastic model to the user for that particular store.

FIG. 5 illustrates a diagram 500 in which a list ordering model dynamically updates recommendations for a list based on computer-based actions performed by a user, in accordance with at least one embodiment. In at least one embodiment, mobile device 502 stores executable code for using a list ordering model 504 to generate predictions for in-store navigation. In various embodiments, list ordering model 504 is implemented using one or more sequence models, examples of which include Markov chain, hidden Markov model, recurrent neural network, and more.

In at least one embodiment, list ordering model 504 is utilized to cluster and order items of a shopping list, such as in the manner described in connection with FIG. 4. The grouping may be ordered such that the sequence of groups has the highest probability of occurring. As shown in FIG. 4, that sequence may be a first group with {carrots, celery, lime juice} followed by a second group with {bread, cheese, cream cheese}, and then followed by a third group {orange juice, milk}. This initial ordering is shown as numeral 506 in FIG. 5. In some embodiments, a user may perform computer-based actions indicating that the recommendation should be dynamically updated. For example, as shown on the left side of FIG. 5, a user may perform a computer-based action (e.g., check off on mobile app) on an item from the second group prior to performing a computer-based action on any of the items from the first group. Continuing with this example, the recommendations may be dynamically updated in response to the user's performance of the computer-based action on the item in the second group. For example, state transition probabilities may be evaluated to determine whether the user is more likely to transition from the second group to the first group or the third group, and an updated recommendation may be generated. For example, performing a computer-based action to check off "bread" from the mobile app may cause other items of that group, "cheese" and "cream cheese" to be presented at the top of the graphical user interface, and then the sequence of groups with the highest probably of occurring given the second group as the starting state may be computed. This sequence may be different from the original ordering generated at numeral 506. In various embodiments, the recommendations are dynamically updated in response to a computer-based action performed by a user to update a list, for example, checking off an item or skipping an item, indicating that the user is currently performing a task related to that group. The updated ordering is illustrated as numeral 508 in FIG. 5.

FIG. 6 shows an illustrative example of a process 600 for generating a list ordering model that can be used to predict an order in which a list of items should be presented to a user, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-8. In at least one embodiment, process 600 or a portion thereof is implemented by a computing resource service provider.

In at least one embodiment, a system that performs at least a portion of process 600 stores executable instructions to obtain 602 a plurality of lists with location metadata in common. Lists may be in accordance with those described elsewhere in this disclosure, for example, the lists obtained in this step may be historical lists of previous shopping trips to a particular location, which may be identified by a location identifier. Historical shopping trips may be recorded as including a list of items and, for some or all items of the list, corresponding time stamps of when a user performed an action on the item. For example, previous shopping trips to a store may include a list of items and timestamps of when a user performed computer-based actions on those items. For example, a user may perform a computer-based action to check off an item when the user gets the item from a grocery store or may perform a computer-based action to complete an item such as visiting a point of interest on a hike. In at least one embodiment, each shopping trip is tagged or otherwise associated with a location identifier that indicates where the shopping trip took place.

A mobile application may ask users for consent to record information about shopping trips to better help other shoppers. In at least one embodiment, users have the choice to either opt-in or opt-out—for users that opt-in, the order in which a user checked off items on a shopping trip may be recorded, as well as a location identifier associated with the shopping trip. In various cases, privacy of user data may be preserved such that any PII or PHI information is redacted. For example, if a user included a prescription medication in the shopping list, that shopping item may be pseudonymized or redacted to preserve the user's privacy. Data collection techniques such as those described in connection with FIGS. 1-3 may be utilized to obtain the plurality of lists.

A plurality of lists may be obtained in any suitable manner. For example, if a user has opt-ed in, the user's shopping trip history may be collected, redacted, and then uploaded to a service provider data store in a secure manner. The system performing process 600 may then subsequently access the data store at a later point in time, such as when a sufficiently large number of shopping trips have been stored to develop a robust training data set. The data store may be any suitable data storage system, such as network attached storage or a database system. Two lists may have metadata in common if they were both shopping trips that were made at the same store. Other types of metadata relating to shopping trips may also share a commonality. For example, a first shopping trip to a first location of a particular chain store and a second shopping trip to a second location of the same chain store may have location metadata in common—namely, the location type. As another example, all grocery stores may have location metadata in common.

In at least one embodiment, a system that performs at least a portion of process 600 stores executable instructions to determine 604 a training data set from the plurality of lists. In various embodiments, the plurality of historical lists includes descriptions of items, completion timestamps. A historical list may be associated with a particular location identifier. In various embodiments, some of the lists may be excluded based on an analysis of the user's completion behavior. In various embodiments, a system performing process 600 analyzes a user's completion behavior to determine whether a user is performing computer-based actions on items during a shopping trip in a contemporaneous manner, or if they are bulk performing computer-based actions on the items at the end of the trip. In at least one embodiment, this determination is aided through the use of geolocation data—for example, if a user's timestamps for performance of computer-based actions on items on a list are at a location different than the location identifier of the list, that may be an indication that the user did not concurrently perform computer-based actions on the items while the tasks were being performed. In some embodiments, the timestamps of computer-based actions for a user's historical shopping trip are analyzed and clustered together temporally such that items for which computer-based actions were performed in close temporal proximity to one another are clustered together. Historical shopping trips of other users with similar items may also be analyzed to determine temporal distances between items. In various embodiments, a bi-modal (or multi-modal) distribution of temporal distances may arise, indicating two (or more) different behaviors by users. For example, one peak of a bi-modal distribution may indicate a zero or near-zero temporal distance from other items, indicating that computer-based actions were performed in close temporal proximity to each other, whereas the second peak of the bi-modal distribution may indicate a larger difference in time between the performance of computer-based actions, indicating that the items belong in two different clusters. Continuing with this illustrative example, users whose shopping trips exhibited the first behavior of zero or near-zero temporal distances for all items where there also existed a second, non-zero peak may be identified as users that performed computer-based actions in bulk. Such users may be excluded from the training data set. For example, a subset of users that performed computer-based actions to complete or check off items all (or mostly) at once may be excluded from the training data set.

In at least one embodiment, a system that performs at least a portion of process 600 stores executable instructions to determine 606 a list ordering model based on the training data set, wherein the list ordering model is trained to receive, as an input to the list ordering model, a plurality of items and determine, as an output to the list ordering model, an order of the plurality of items. A list ordering model may refer to a stochastic model such as a Markov chain. The training data set may be identified as described above. In various embodiments, the list ordering model comprises one or more states and state transition probabilities between the states. Training the list ordering model may include determining the set of states and then determining probabilities that one state leads to a next state. For example, in some embodiments, items are clustered together based on temporal proximity of their completion timestamps, and items in close temporal proximity to each other are grouped together in the same state. Various techniques may be utilized to determine an optimal number of states for a training data set that may have many different types of items. In some embodiments, each state corresponds to exactly one item—this may arise in the case where no grouping of items is desired. In at least one embodiment, a machine-learning classification model such as a K-nearest neighbors (k-NN) is used to determine classifications for items.

Ordering a plurality of items on a shopping list may comprise clustering items into one or more groups where items are assigned to a common group based on a high likelihood that they will be checked off in close temporal proximity to each other, determining all permutations of the one or more groups (e.g., N! for N groups), and then selecting the permutation with the highest probability of occurring, and then re-ordering the plurality of items so that each from a first group appears before items of a second group. Using the list depicted in FIG. 4 as an example, the input list (e.g., numeral 406 in FIG. 4) may be clustered into three groups and then re-ordered so that in an ordered list, every item in "Group 1" appears before every item in "Group 2" and every item in "Group 2" appears before every item in "Group 3" and so on. As depicted in FIG. 4, one valid ordered list is {{Carrots, Celery, Lime Juice}; {Bread, Cheese, Cream Cheese}; {Orange Juice, Milk} }. In some embodiments, items within a group are not necessarily ordered, and another equally suitable valid ordered list is {{Lime Juice, Carrots, Celery,}; {Cream Cheese, Bread, Cheese}; {Milk, Orange Juice} }. In various embodiments, an ordered list refers to an order of groups of items, wherein there is not necessarily an internal ordering of items inside of a particular group.

In some embodiments, there may be a low confidence score as to which state an item should be assigned to. For example, various users rely on nicknames or semantically ambiguous shopping list items which may encode semantic meaning to the user. One such example may be that a first user uses "Choco" to describe chocolate candy bars and another user uses "Choco" to describe chocolate milk. Assuming that these two items are located in different areas of a grocery store, the temporal distances between these items and other items may be different. Continuing with the example, user-specific list ordering models may be trained wherein a user's own shopping history is given higher weight during training than an otherwise similar shopping history of another user. For example, if the system performing process 600 is training the list ordering model for a first user and the training data set comprises a first historical shopping trip associated with the first user and a second historical shopping trip associated with a second user, then the first historical shopping trip may be weighted higher during training than the second historical shopping trip meaning that, in at least one embodiment, the historical shopping trip of the first user influence the state transition probabilities more than the historical shopping trips of the second user. Similarly, if a second list ordering model is being generated for the second user, then the second historical shopping trip may be weighted more heavily during training than the first historical shopping trip as described above, in at least one embodiment. Accordingly, the "Choco" item may then be weighted more heavily towards a cluster of items that includes various types of candy bars for the first user and may be weighted more heavily towards a cluster of items that includes various types of dairy and milk products for the second user. The relative weights of a user's own shopping trips and others' shopping trips can be configured based on empirical analysis, through supervised machine learning, backtesting, or various other suitable techniques. In various embodiments, the list ordering model comprises one or more artificial neural networks (ANN). In at least one embodiment, a recurrent neural network (RNN) is trained using the training data set to receive, as inputs, a list of items and generate, as an output, an ordering of the list of items that has the highest probability of occurring, based on the temporal distance between the various items in the list.

Different types of list ordering models may be generated. For example, an identifier-specific list ordering model may refer to a list ordering model that is trained specifically using training data that was collected for a particular location identifier. In some embodiments, other list ordering models may be generated that incorporate a broader range of training data. In one example, "Generic Foods" may refer to a grocery chain with multiple stores, and a list ordering model may be generated across all "Generic Foods" based on shopping trips that include location metadata that indicates those shopping trips were made at an applicable "Generic Foods" store. In some embodiments, a list ordering model is generated using historical shopping trips from all grocery stores or all stores of a category. These list ordering models, which have location metadata in common with a specific location, may be used to bootstrap the creation of a list ordering model for a location that does not have an identifier-specific list ordering model—for example, when a new store opens.

In at least one embodiment, a system that performs at least a portion of process 600 stores executable instructions to receive 608 requests from a mobile device, the request encoding a location identifier. The system may then select 610 an applicable list ordering model based on the location identifier. In various embodiments, a system performing process 600 checks whether an identifier-specific list ordering model exists for the specified location identifier. If it does, then the identifier-specific list ordering model may be selected, but if it does not, then another list ordering model may be selected based on having metadata in common, such as a common type of location or category. In various embodiments, a user-specific identifier-specific list ordering model is selected, where applicable. The system may provide 612, based on the selected list ordering model, a response to the request. In some embodiments, the system provides the selected list ordering model in response to the mobile device and the mobile device locally computes an order for a shopping list. In some embodiments, the system is a computing resource service provider that obtains the user's active shopping list (e.g., from a data storage service of the computing resource service provider), uses the selected list ordering model to determine an ordering for the shopping list (e.g., order of items with highest probability of occurring), and provides the ordering to the mobile device as a response.

FIG. 7 shows an illustrative example of a process 700 for generating recommendations using a list ordering model that determines an ordering for how a list of items should be presented to a user, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-8. In at least one embodiment, process 700 or a portion thereof is implemented by a mobile device that includes a GPS receiver. In some embodiments, process 700 or a portion thereof is implemented by a computing resource service provider, which may generate an order for a user's list of items and send recommendations to the user for which items to find next.

In at least one embodiment, a system that performs at least a portion of process 700 stores executable instructions to determine 702 location metadata for a mobile device. In at least one embodiment, the system is a mobile device with a GPS receiver that obtains geolocation information in the form of GPS coordinates, which can be used to resolve the user's location to being at or near a location. The location may be a store, point of interest, etc. that is uniquely associated with a location identifier. In at least one embodiment, the system determines location metadata based on a Wi-Fi connection that is established. For example, a particular store or chain may have publicly available Wi-Fi that can be used to identify the user's location when a mobile device is connected to a particular Wi-Fi network. In some embodiments, cellular or other wireless triangulation techniques may be utilized using wireless connections to determine location metadata for the system. In some embodiments, the system is the mobile device. In some embodiments, the system is a separate system such as a computing resource service provider that determines the location of the mobile device based on connectivity information or location metadata/information that the mobile device sends to the computing resource service provider.

In at least one embodiment, a system that performs at least a portion of process 700 stores executable instructions to select 704 a list ordering model associated with the location metadata, wherein the list ordering model is trained using a plurality of lists, further wherein a first list of the plurality comprises a first plurality of items and corresponding timestamps of when computer-based actions were performed on at least a portion of the first plurality of items. In at least one embodiment, the list ordering model is a stochastic model such as a Markov chain or hidden Markov model. In at least one embodiment, the system selects the list ordering model by submitting a request for a list ordering model over a network to a service provider. The request may encode information about the user's location, such as a location identifier or GPS coordinates. In response to the request, the system may receive a list ordering model from the service provider. A list ordering model may be selected locally on a mobile device from among various available list ordering models. For example, if the user has previously visited a particular location, a location identifier-specific list ordering model may be stored or cached locally, and such a list ordering model may be stored locally. As an illustrative example, if a user visits a first "Generic Foods" grocery store for the first time, the user's mobile device may request the user's permission to download a first list ordering model for the specific "Generic Foods" grocery store as well as a second list ordering model that is generated for all "Generic Foods" grocery stores. Continuing with the illustrative example, if the user visits a different "Generic Foods" grocery store, then the second list ordering model may be used if a location identifier-specific list ordering model is not available for that different store. The list ordering model may be trained in any suitable manner, such as by using techniques described in connection with FIG. 6.

In some embodiments, the list ordering model may be selected by the system determining an identifier associated with a location of the system (e.g., using a GPS receiver) and determining whether an identifier-specific list ordering model exists for the location. In some cases, the system submits a request to a service provider for an identifier-specific list ordering model. If no such identifier-specific list ordering model exists for the location, the system may then determine a property of the location. Metadata of the location may be used to determine the property of the location, such as whether it is a grocery store, pharmacy, hardware store, park, etc. The system may then select a list ordering model that is trained based on other locations that share the property that was identified. For example, if an identifier-specific list ordering model is not found for a hardware store, the system may instead select a list ordering model generated from other hardware stores which can, in some cases, still provide navigational assistance to users.

In at least one embodiment, a system that performs at least a portion of process 700 stores executable instructions to obtain 706 a second list comprising a second plurality of items, wherein the second list comprises a second plurality of items. This list may be a current list, as opposed to the historical lists that were used to train the list ordering model, which does not have completion times for some or all items of the list. In some embodiments, the user selects the current shopping list to use for in-store navigation via a mobile application. For example, a user may arrive at a location, launch a mobile application on a mobile device, and then select a shopping list with items that the user wishes to get at the location. In some embodiments, when a user launches a mobile application, the user is prompted with a request to grant access to check location information and provide in-store navigation recommendations. If the user declines to provide access, then the order of the user's list is preserved, and no recommendations are generated. If the user grants permission to generate in-store navigation recommendations, a list ordering model may cluster items of the user's grocery list. Clustering may refer to forming groups of items that are likely to be completed or found concurrently with each other, or within close temporal proximity. In some embodiments, the items are clustered into two or more groups, and then an initial group is selected. The initial group may be the group with the item that has the highest probability of being selected first. In some embodiments, the initial group is the first group in the sequence of groups that has the highest likelihood of occurring, based on the list ordering model.

In at least one embodiment, a system that performs at least a portion of process 700 stores executable instructions to determine 708, using the list ordering model, an order of the second list of items that corresponds to how likely a user is to perform computer-based actions in that order. For example, the order may be the permutation of second list of items that has the highest probability of occurring, according to the list ordering model. In at least one embodiment, the list ordering model accepts a list of items as an input, groups the items of the list into one or more clusters, and then orders the clusters based on a maximum likelihood. For example, a sequence of five clusters of items may be ordered in 120 different permutations—in at least one embodiment, the probability of each sequence occurring is computed and the sequence with the highest probability is selected as the output. In some embodiments, each cluster corresponds to a single time; in some embodiments, clusters can correspond to multiple items that are likely to be completed or found in close temporal proximity to each other based on historical data collected from users' previous shopping lists. Dynamic programming may be used to determine the optimal sequence of items and/or groups for a list of items. The optimal sequence may be the sequence with the highest likelihood of occurring, according to a list ordering model. In some embodiments, the list ordering model clusters items into two or more groups and determines the likelihood of each sequence of groups. In some embodiments, items within groups are ordered by likelihood.

In some embodiments, a system determines, using the list ordering model and the second plurality of items, a plurality of groups that collectively comprises the second plurality of items, wherein items of the second plurality of items are assigned to groups based on how likely they are to be completed or found together. Items which are completed or found in close proximity together may be clustered together. Clusters may be determined using K-nearest neighbors (k-NN) or other suitable classification models. A recommended sequence of groups may be determined based on how likely the sequence is to be completed or found in that specific order.

In at least one embodiment, a system that performs at least a portion of process 700 stores executable instructions to select 710, based on the order of the second list of items, a first item. In various embodiments, the order of the second list of items is in sequential order, with the first item in the ordered list being the first item that the user would find in the most likely permutation of items. In various embodiments, a first cluster of items is selected, for example, as described above in connection with FIG. 5.

In at least one embodiment, a system that performs at least a portion of process 700 stores executable instructions to provide 712 recommendations for the user of the mobile device to find the first item. In various embodiments, the recommendation is presented to a user on a graphical user interface. The recommendation may include a single item, a group of items, an entire list of items ordered, etc. according to the list ordering model. Recommendations may be provided in a list format—for example, some or all items of a first group may be presented via a graphical user interface of a mobile device.

In some embodiments, an initial recommendation is made based on a full shopping list where none of the items have yet been marked as completed or found. In some embodiments, as a user interacts with the shopping list, recommendations for in-store navigation are updated. For example, a list ordering model may group various items in a shopping list together such that a first group comprises {celery, carrots, lime juice}, a second group comprises {bread, cheese, cream cheese}, and a third group comprises {orange juice, milk}. As an illustrative example, the list ordering model may then determine the order of these three groups that are most likely to occur is {first group, second group, third group} and generate such a recommendation. The recommendation may, for example, present a user of a mobile device with a graphical user interface that surfaces items of the first group on top, followed by items of the second group, and then the third group. In various embodiments, a user may check off or complete an item from the second group prior to marking any of the items from the first group as being completed or found. Continuing with this example, the recommendations may be dynamically updated in response to the user's checking off the item in the second list. For example, state transition probabilities may be evaluated to determine whether the user is more likely to transition from the second group to the first group or the third group, and an updated recommendation may be generated. For example, checking off "bread" may cause other items of that group, "cheese" and "cream cheese," to be presented at the top of the graphical user interface, and then the sequence of groups with the highest probability of occurring given the second group as the starting state may be computed. In various embodiments, the recommendations are dynamically updated in response to a computer-based action performed by a user to update a list, for example, checking off an item or skipping an item, indicating that the user is currently performing a task related to that group.

The examples presented herein are not meant to be limiting.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Recommendation subsystem 836 may refer to software, hardware, or a combination thereof that implements various systems and methods described in connection with FIGS. 1-7. For example, recommendation subsystem 836 may be a mobile application that can be executed using hardware processor 802 and performs various functionality, such as processes described in connection with FIG. 6 and FIG. 7, and/or perform various functionality described in connection with FIG. 1. In at least one embodiment, device 800 is a mobile device. In at least one embodiment, descriptions of mobile devices and systems described throughout this disclosure may refer to device 800 and implemented at least in part using recommendation subsystem 836. For example, recommendation subsystem 836 may be software that uses a list ordering model to generate recommendations that are surfaced to a user via graphics display device 810.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additionally, the phrase "based on" may be synonymous to "based at least in part on" rather than "based solely on" unless it is explicitly stated or clear from the context that the latter meaning is intended. Additionally, the various terms used throughout this disclosure may relate to various fields of mathematics, science, and/or engineering. These terms are to be interpreted according to their respective fields unless otherwise clear from the context in which they are being described. As a non-limiting example, the terms "proper subset" and "subset" are to be interpreted according to their definitions given in mathematical set theory, unless clearly indicated by the context.

What is claimed is:

1. A system, comprising:
   one or more processors; and memory storing executable instructions that, as a result of execution by the one or more processors, cause the system to:

determine metadata for a location of the system;

select a list ordering model associated with the metadata, wherein the list ordering model is trained using a plurality of lists, further wherein a first list of the plurality comprises a first plurality of items and timestamps of when at least a portion of the first plurality of items were checked off;

obtain a second list comprising a second plurality of items;

assign, using the list ordering model, the second plurality of items into one or more groups, wherein a first item and a second item being assigned to a first group of the one or more groups indicates the first item and the second item are probabilistically likely to be checked off in close proximity to each other based on a first timestamp of the timestamps associated with the first item and a second timestamp of the timestamps associated with the second item;

determine, using the list ordering model, an order of the one or more groups that improve user navigation of the location, the order determined based on how likely a user is to check off items from the one or more groups in the determined order, wherein the order is a permutation of the one or more groups that has a highest probability of occurring, according to the model;

generate a first recommendation associated with the first item in the first group of the one or more groups;

dynamically updating the order of the one or more groups based on user interaction with the first recommendation; and cause presentation of the updated order of the one or more groups on a mobile device.

2. The system of claim 1, wherein the instructions include further instructions that, as a result of execution by the one or more processors, further cause the system to:

select one or more items from the first group of the one or more groups; and provide a second recommendation for the one or more items.

3. The system of claim 1, wherein the instructions to select the list ordering model associated with the metadata include instructions that, as a result of execution, cause the system to:

determine an identifier associated with the metadata for the location;

determine an identifier-specific list ordering model does not exist for the location;

determine a parameter of the location; and select the list ordering model, wherein the list ordering model is trained based on other locations that share the parameter.

4. The system of claim 1, wherein the instructions include further instructions that, as a result of execution by the one or more processors, further cause the system to:

detect an indication that a third item of the second list has been checked off prior to detecting that the first item has been checked off; and determine, using the list ordering model and the third item, a second order for a subset of the second list, wherein the subset of the second list excludes the third item.

5. The system of claim 1, wherein a group comprises an unordered subset of the second plurality of items.

6. The system of claim 1, wherein the list ordering model comprises a hidden Markov model.

7. The system of claim 1, wherein the instructions to determine the metadata for the location of the system include instructions that, as a result of execution by the one or more processors, cause the system to obtain the metadata based on geolocation information obtained from a global positioning satellite (GPS) receiver of the system or based on a wireless connection that is established by the system.

8. A non-transitory computer-readable storage medium storing executable instructions that, as a result of being executed by one or more processors of a device, cause the device to at least:

determine metadata for a location of the system;

select a list ordering model associated with the metadata, wherein the list ordering model is trained using a plurality of lists, further wherein a first list of the plurality comprises a first plurality of items and timestamps of when at least a portion of the first plurality of items were checked off;

obtain a second list comprising a second plurality of items;

assign, using the list ordering model, the second plurality of items into one or more groups, wherein a first item and a second item being assigned to a first group of the one or more groups indicates the first item and the second item are probabilistically likely to be checked off in close proximity to each other based on a first timestamp of the timestamps associated with the first item and a second timestamp of the timestamps associated with the second item;

determine, using the list ordering model, an order of the one or more groups that improves user navigation of the location, the order determined based on how likely a user is to check off items from the one or more groups in the determined order, wherein the order is a permutation of the one or more groups that has a highest probability of occurring, according to the model;

generate a recommendation associated with the first item included in the first group of the one or more groups;

dynamically updating the order of the one or more groups in response to user interaction with the recommendation of the first item; and cause presentation of the updated order of the one or more groups on a mobile device.

9. The non-transitory computer-readable storage medium of claim 8, wherein the instructions include further instructions that, as a result of execution by the one or more processors, further cause the system to:

select a third item from a second group of the one or more groups; and provide a second recommendation for the third item.

10. The non-transitory computer-readable storage medium of claim 8, wherein the instructions to select the list ordering model associated with the metadata include instructions that, as a result of execution, cause the system to:

determine an identifier associated with the metadata for the location;

determine an identifier-specific list ordering model does not exist for the location;

determine a parameter of the location; and select the list ordering model, wherein the list ordering model is trained based on other locations that share the parameter.

11. The non-transitory computer-readable storage medium of claim 8, wherein the instructions include further instructions that, as a result of execution by the one or more processors, further cause the system to:

detect an indication that a third item of the second list has been checked off prior to detecting that the first item has been checked off; and determine, using the list ordering model and the second item, a second order for a subset of the second list, wherein the subset of the second list excludes the third item.

12. The non-transitory computer-readable storage medium of claim 8, wherein a group comprises an unordered subset of the second plurality of items.

13. The non-transitory computer-readable storage medium of claim 8, wherein the list ordering model comprises a hidden Markov model.

14. The non-transitory computer-readable storage medium of claim 8, wherein the instructions to determine the metadata for the location of the system include instructions that, as a result of execution by the one or more processors, cause the system to obtain the metadata based on geolocation information obtained from a global positioning satellite (GPS) receiver of the system or based on a wireless connection that is established by the system.

15. A system, comprising:
 one or more processors; and
 memory storing executable instructions that, as a result of execution by the one or more processors, cause the system to:
  determine metadata for a location of the system;
  select a list ordering model associated with the metadata, wherein the list ordering model is trained using a plurality of lists, further wherein a first list of the plurality comprises a first plurality of items and timestamps of when at least a portion of the first plurality of items were checked off;
  obtain a second list comprising a second plurality of items;
  assign, using the list ordering model, the second plurality of items into one or more groups, wherein a first item and a second item being assigned to a first group of the one or more groups indicates the first item and the second item are probabilistically likely to be checked off in close proximity to each other based on a first timestamp of the timestamps associated with the first item and a second timestamp of the timestamps associated with the second item;
  determine, using the list ordering model, an order of the one or more groups that improve user navigation of the location, the order determined based on how likely a user is to check off items from the one or more groups in the determined order;
  generate a first recommendation associated with the first item in the first group of the one or more groups;
  detect an indication that a third item of the first recommendation based on the second list has been checked off prior to detecting that the first item has been checked off;
  determine, using the list ordering model and the third item, a second order for at least a subset of items, wherein the subset excludes the third item; and
  cause presentation of the second order for at least the subset of items on a mobile device.

16. The system of claim 15, wherein the instructions include further instructions that, as a result of execution by the one or more processors, further cause the system to:
 select one or more items from the first group of the one or more groups; and
 provide a second recommendation for the one or more items.

17. The system of claim 15, wherein the instructions to select the list ordering model associated with the metadata include instructions that, as a result of execution, cause the system to:
 determine an identifier associated with the metadata for the location;
 determine an identifier-specific list ordering model does not exist for the location;
 determine a parameter of the location; and
 select the list ordering model, wherein the list ordering model is trained based on other locations that share the parameter.

18. The system of claim 15, wherein a group comprises an unordered subset of the second plurality of items.

19. The system of claim 15, wherein the list ordering model comprises a hidden Markov model.

20. The system of claim 15, wherein the instructions to determine the metadata for the location of the system include instructions that, as a result of execution by the one or more processors, cause the system to obtain the metadata based on geolocation information obtained from a global positioning satellite (GPS) receiver of the system or based on a wireless connection that is established by the system.

\* \* \* \* \*